United States Patent
Yuan

(10) Patent No.: US 12,514,230 B1
(45) Date of Patent: Jan. 6, 2026

(54) CAT SCRATCHING FURNITURE PROTECTORS

(71) Applicant: Fenhui Yuan, Zhengzhou (CN)

(72) Inventor: Fenhui Yuan, Zhengzhou (CN)

( * ) Notice: Subject to any disclaimer, the term of this patent is extended or adjusted under 35 U.S.C. 154(b) by 0 days.

(21) Appl. No.: 19/030,995

(22) Filed: Jan. 17, 2025

(51) Int. Cl.
| | |
|---|---|
| *A01K 15/02* | (2006.01) |
| *B32B 5/02* | (2006.01) |
| *B32B 5/18* | (2006.01) |
| *B32B 5/24* | (2006.01) |
| *B32B 5/26* | (2006.01) |
| *B32B 7/12* | (2006.01) |
| *B32B 33/00* | (2006.01) |
| *B32B 38/00* | (2006.01) |
| *B32B 43/00* | (2006.01) |
| *D03D 15/283* | (2021.01) |
| *D03D 25/00* | (2006.01) |

(52) U.S. Cl.
CPC ............ *A01K 15/024* (2013.01); *B32B 5/024* (2013.01); *B32B 5/18* (2013.01); *B32B 5/245* (2013.01); *B32B 5/263* (2021.05); *B32B 7/12* (2013.01); *B32B 33/00* (2013.01); *B32B 38/0004* (2013.01); *B32B 38/0012* (2013.01); *B32B 38/0036* (2013.01); *B32B 43/003* (2013.01); *D03D 15/283* (2021.01); *D03D 25/005* (2013.01); *B32B 2038/0084* (2013.01); *B32B 2255/02* (2013.01); *B32B 2255/24* (2013.01); *B32B 2255/26* (2013.01); *B32B 2255/28* (2013.01); *B32B 2262/0269* (2013.01); *B32B 2262/0276* (2013.01); *B32B 2266/0214* (2013.01); *B32B 2305/72* (2013.01); *B32B 2307/54* (2013.01); *B32B 2307/546* (2013.01); *B32B 2307/584* (2013.01); *B32B 2307/72* (2013.01); *B32B 2307/7376* (2023.05); *B32B 2571/00* (2013.01); *D10B 2331/04* (2013.01)

(58) Field of Classification Search
CPC .. A01K 15/024; D03D 15/283; D03D 25/005; B32B 5/263; B32B 5/024; B32B 5/18; B32B 5/245; B32B 7/12; B32B 2307/7376; B32B 2038/0084; B32B 2255/02; B32B 2255/24; B32B 2255/26; B32B 2255/28; B32B 2262/0269; B32B 2262/0276; B32B 2266/0214; B32B 2305/72; B32B 2307/54; B32B 2307/546; B32B 2307/584; B32B 2307/72; B32B 2571/00; D10B 2331/04
See application file for complete search history.

(56) References Cited

U.S. PATENT DOCUMENTS

2018/0283014 A1* 10/2018 Hodgkins ............. E04F 15/105

* cited by examiner

*Primary Examiner* — Hai Vo
(74) *Attorney, Agent, or Firm* — Nitin Kaushik

(57) ABSTRACT

The adhesive anti-scratch pad for pets includes a surface layer, at the bottom of which an intermediate layer is arranged. A reinforcement layer is arranged between the intermediate layer and the surface layer. A back layer is arranged at the bottom of the intermediate layer. An induction layer is arranged on the outer side of the surface layer, and an adhesion aid layer is arranged on the outer side of the back layer.

4 Claims, 1 Drawing Sheet

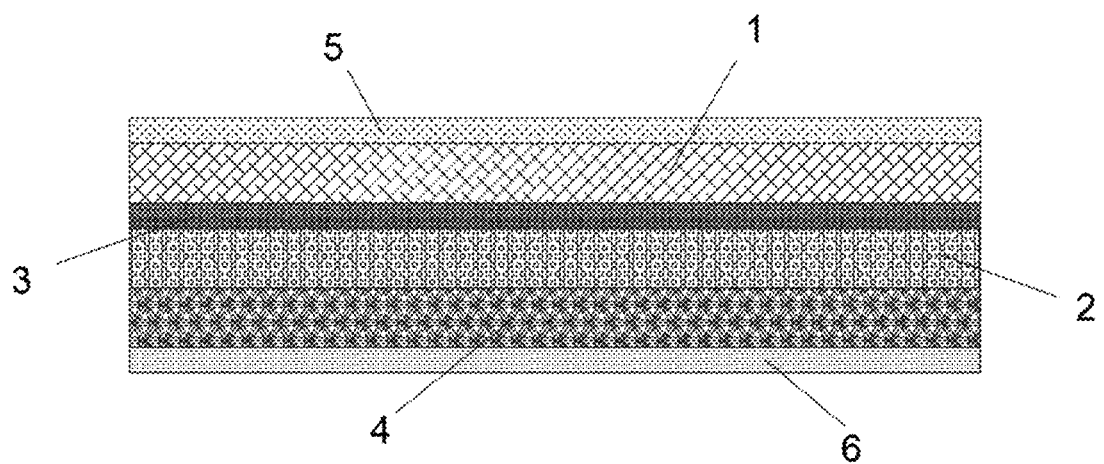

CAT SCRATCHING FURNITURE PROTECTORS

TECHNICAL FIELD

The invention relates to the technical field of anti-scratch pads for pets, specifically to an adhesive anti-scratch pad for pets.

BACKGROUND ART

Pets (such as cats and dogs) tend to scratch furniture, walls, and other household surfaces. This problem has long plagued many pet-owning families. The scratching behavior of pets stems from their instinctive needs, serving to sharpen claws, mark territory, and relieve stress. However, this behavior has caused considerable damage to the household environment, especially high-value items such as fabric sofas, leather furniture, and wooden door frames, which are often the primary targets of pet scratching. Aiming to address this problem, various types of anti-scratch mat products have emerged on the market. These products usually protect the furniture surface from scratching damage by directly sticking or covering.

Nevertheless, the existing technology still has the following key defects that need to be improved urgently, such as:

1. Despite their high hardness and wear resistance, existing scratch-resistant materials (e.g., hard plastics) lack flexibility and are difficult to adhere to irregular surfaces. On the other hand, although soft materials (e.g., silicone) have good flexibility, they are prone to tearing during scratching, resulting in a short product lifespan.

2. The existing adhesive technology cannot achieve firm adhesion, which may cause the detachment or displacement of anti-scratch pads.

3. The scratching behavior of pets is somewhat random and instinctively driven. Existing anti-scratch pads can only provide protection for the covered area, but fail to prevent pets from transferring their scratching behavior to uncovered furniture parts or other household surfaces.

In summary, the existing anti-scratch pad technology presents noticeable defects in terms of material performance, adhesive effectiveness, and control over scratching behavior. To solve the above problems, we invent an adhesive anti-scratch pad for pets.

Contents of the Invention

In view of the defects of the existing technology, the present invention provides an adhesive anti-scratch pad for pets in the hope of solving the problems raised in the background art.

The above technical objectives of the present invention are achieved through the following technical solutions:

The adhesive anti-scratch pad for pets includes a surface layer, at the bottom of which an intermediate layer is arranged. A reinforcement layer is arranged between the intermediate layer and the surface layer. A back layer is arranged at the bottom of the intermediate layer. An induction layer is arranged on the outer side of the surface layer, and an adhesion aid layer is arranged on the outer side of the back layer.

The surface layer is made of polyester fiber material and constructed by a three-dimensional weaving process, wherein the warp and weft yarns are interweaved at 90° and vertical auxiliary fibers are set between the interweaving points to form a regular mesh texture structure. The spacing of the texture structure ranges from 2 mm to 5 mm, and the friction coefficient of the texture surface varies between 0.6 and 0.8.

The intermediate layer is composed of chemical cross-linked foamed XPE cotton, with a density of 30-50 kg/m$^3$ and a thickness of 3-6 mm. After being treated by the chemical cross-linking process, the intermediate layer gains a compressive strength of not less than 20 kPa and a flexible bending radius of not more than 5 cm.

The reinforcement layer is composed of aramid fiber in a mesh interwoven structure, with a mesh size of 5-10 mm, and is fixed between the surface layer and the intermediate layer by an adhesive.

The back layer is made of an EVA hot melt adhesive, with a thickness of 0.2-0.5 mm and a softening point of 60-80° C., and is coated on the bottom of the intermediate layer.

The induction layer consists of a microcapsule coating extracted from plants, wherein the diameter of the microcapsules lies between 10 µm and 20 µm and the coverage rate varies from 85% to 95%. Besides, the coating, being 10-50 µm thick, is formed by uniform spraying.

The adhesion aid layer comprises a polyurethane coating containing nano silicon particles, wherein the incorporation proportion of nano silicon particles is 5%-10% and the thickness of the coating is 0.05-0.2 mm.

Besides, the polyester fiber of the surface layer is subjected to high-temperature setting treatment at a setting temperature of 160-180° C., and the tensile strength of the fiber is not less than 300 N.

The XPE cotton in the intermediate layer is molded by double-roller hot pressing at a molding pressure of 200-400 kPa, and the foaming ratio is 15 times to 30 times.

The aramid fiber of the reinforcement layer is 0.05-0.1 mm in diameter, and the mesh intersections are reinforced by adhesive coating, the thickness of adhesive coating being 0.01-0.03 mm.

The EVA hot melt adhesive on the back layer, whose adhesion ranges from 1 N/cm to 3 N/cm, is suitable for surfaces with a roughness of 0.5-2 mm.

The plant extract of the induction layer is a mixture of geraniol and eucalyptus essential oil, the mixing ratio being 1:1 to 2:1.

Furthermore, this invention also provides the method for preparing the adhesive anti-scratch pad for pets. The preparation steps include:

S1. The surface layer is prepared by forming a mesh structure through the application of three-dimensional weaving to polyester fiber and then performing high-temperature setting treatment on the formed mesh structure.

S2. The intermediate layer is prepared by producing XPE cotton through chemical crosslinking and physical foaming, with the foaming ratio controlled at 15-30 times, and performing double-roll hot pressing on the produced XPE cotton.

S3. The reinforcement layer is prepared by forming a mesh structure through the application of multi-layer interweaving to aramid fiber, reinforcing the mesh intersections with an adhesive, and then cutting the mesh structure into the required size. The reinforcement layer is placed between the surface layer and the intermediate layer, and the three layers are bonded by adhesive lamination.

S4. The bottom of the intermediate layer is coated with an EVA hot melt adhesive to form a back layer, with the coating thickness controlled between 0.2 mm and 0.5 mm.

S5. A microcapsule coating extracted from plants is sprayed on the outside of the surface layer to form an induction layer, and a polyurethane coating containing nano-silicon particles is coated on the outside of the back layer to form an adhesion aid layer.

S6. The composite structure is cut into the target size, and the edge is processed through heat sealing. Eventually, the preparation of the anti-scratch pad is completed.

In summary, the present invention mainly has the following beneficial effects:

1. In the present invention, the combination of the three-dimensional woven polyester fiber of the surface layer, the aramid fiber mesh of the reinforcement layer, and the XPE cotton buffer design of the intermediate layer not only improves the scratch resistance of the anti-scratch pad, but also ensures flexibility and enables it to adapt various irregular furniture surfaces. In addition, the three-dimensional woven mesh texture structure improves the scratch resistance of the surface, further enhancing durability and effectively prolonging the service lifespan of the product.

2. In the present invention, the adoption of an EVA hot melt adhesive as the back layer material and nano silicon particle coating in the adhesion aid layer endows the anti-scratch pad with an excellent adhesion effect on the surfaces of different materials, whether smooth or rough. This design ensures the adhesion stability of the product in complex environments such as high-temperature and humid environments, avoids problems such as detachment and displacement, and improves the convenience of use.

3. In the present invention, the induction layer emits a specific smell through plant extracts, which attracts pets to focus their scratching on the surface of the anti-scratch pad and reduces the possibility of damage to other furniture surfaces. Meanwhile, all materials are selected from environmentally friendly sources to ensure that the product is non-toxic and harmless to pets and family members. The product meets the environmental protection needs of modern families, is suitable for long-term use, and promotes user experience and trust.

BRIEF DESCRIPTION OF THE DRAWINGS

FIG. 1 is a schematic cross-sectional view of the adhesive anti-scratch pad for pets of the present invention.

FIGURE numerals: 1. Surface layer; 2. Intermediate layer; 3. Reinforcement layer; 4. Back layer; 5. Induction layer; 6. Adhesion aid layer.

DETAILED DESCRIPTION

In order to clarify the objectives, technical solutions, and advantages of the embodiments of the present invention, the technical solutions of the embodiments of the present invention will be clearly and completely described below in conjunction with the drawing of the embodiments of the present invention. Obviously, the described embodiments are part of the embodiments of the present invention, rather than all of them. Based on the described embodiments of the present invention, all other embodiments obtained by ordinary technicians in this field without creative effort shall fall within the scope of protection of the present invention.

The following embodiments are used to illustrate the present invention, but they cannot be used to limit the scope of protection of the present invention. The conditions in the embodiments can be further adjusted according to specific conditions. Simple improvements to the method of the present invention under the premise of the concept of the present invention all fall within the scope of protection claimed by the present invention.

Embodiment 1

As displayed in FIG. 1, the adhesive anti-scratch pad for pets includes a surface layer, at the bottom of which an intermediate layer is arranged. A reinforcement layer is arranged between the intermediate layer and the surface layer. A back layer is arranged at the bottom of the intermediate layer. An induction layer is arranged on the outer side of the surface layer, and an adhesion aid layer is arranged on the outer side of the back layer.

The surface layer is made of three-dimensional woven polyester fiber, with a weaving texture spacing of 3 mm and a friction coefficient of 0.75. After high-temperature setting (170° C.), the tensile strength of the fiber reaches 320 N. Such a design endows the product with superior anti-scratch and anti-tear properties.

The intermediate layer is composed of chemical cross-linked foamed XPE cotton, with a density of 45 kg/m$^3$, a thickness of 4 mm, a foaming ratio of 25 times, a compressive strength of up to 26 kPa, and a bending radius of below 4 cm.

The reinforcement layer comprises an aramid fiber mesh structure with a mesh size of 6 mm×6 mm and a fiber diameter of 0.07 mm. The mesh intersections are reinforced by adhesive coating (adhesive coating thickness 0.02 mm). Such a design promotes the tensile strength and interlayer stability of the product.

The back layer adopts a 0.3-mm-thick EVA hot melt adhesive, with an adhesion of 2.2 N/cm, which makes the product suitable for surfaces whose roughness ranges from 0.8 mm to 1.5 mm.

The induction layer is sprayed with microcapsule coating extracted from plants, with a spraying thickness of 15 μm. The extract is a mixture of geraniol and eucalyptus essential oil (ratio 2:1). This layer is designed to direct and induce the scratching behavior of pets.

In the adhesion aid layer, nano silicon particles are incorporated at a proportion of 6%, and the polyurethane coating is 0.1 mm thick. This layer acts to improve the adhesion stability and prevent slippage during scratching.

This embodiment is mainly used in the scenario of high-frequency scratching.

Embodiment 2

As illustrated in FIG. 1, the adhesive anti-scratch pad for pets includes a surface layer, at the bottom of which an intermediate layer is arranged. A reinforcement layer is arranged between the intermediate layer and the surface layer. A back layer is arranged at the bottom of the intermediate layer. An induction layer is arranged on the outer side of the surface layer, and an adhesion aid layer is arranged on the outer side of the back layer.

In the surface layer, the polyester fiber features a weaving texture spacing of 4 mm, a friction coefficient of 0.65, and a tensile strength of not lower than 310 N after high-temperature setting.

In the intermediate layer, the XPE cotton features a density of 40 kg/m$^3$, a thickness of 3.5 mm, a foaming ratio of 20 times, a compressive strength of 22 kPa, and a flexible bending radius controlled at 4.5 cm.

In the reinforcement layer, the aramid fiber features a diameter of 0.08 mm, a mesh size of 7 mm×7 mm, and an adhesive coating thickness at the intersections of 0.015 mm, which significantly enhances the tensile stability on the curved surface.

In the back layer, the EVA hot melt adhesive features a thickness of 0.25 mm, an adhesion of 1.8 N/cm, a softening point of 72° C., which makes the product suitable for pasting on curved surfaces with a radius of more than 3 cm;

In the induction layer, the sprayed microcapsule coating extracted from plants (ratio of eucalyptus essential oil to geraniol 1:1) is 12 μm thick, serving to attract pets to scratch.

In the adhesion aid layer, nano silicon particles are incorporated at a proportion of 8%, and the polyurethane coating is 0.09 mm thick, which remarkably improves the adhesion.

This embodiment is mainly used in the scenario of pasting on a curved surface.

Embodiment 3

The experimental results regarding the anti-scratch performance, curved surface adhesion performance, and comprehensive stability in Embodiment 1 and Embodiment 2 are summarized in Table 1:

| Performance Indicator | Test item | Embodiment 1 | Embodiment 2 | Results and analysis |
|---|---|---|---|---|
| Anti-scratch performance | Simulated scratching times | 9,000 times (45 days, 200 times per day) | 9,000 times (60 days, 150 times per day) | No tearing occurred in both embodiments, and the surface texture was intact. The texture spacing and fiber strength ensured good anti-scratch ability. |
| | Surface layer tensile strength (N) | ≥320 | ≥310 | The strength of the polyester fiber after high-temperature setting ensures durability in the case of scratching, and the friction coefficient of the texture (0.75 in Embodiment 1 and 0.65 in Embodiment 2) meets the design requirements. |
| Adhesion performance | Adhesion force (N/cm) | 2.2 | 1.8 | Embodiment 1 is more suitable for rough surfaces (0.8-1.5 mm), while Embodiment 2 is more applicable to surfaces with a smaller bending radius (>3 cm). Both embodiments show marked stability. |
| | Adhesion firmness (slippage or warping after scratching) | No slippage or warping | No slippage or warping | The backing layer and the adhesion aid layer achieve a remarkable combined effect, ensuring the adhesion stability of the product on high-frequency scratching and curved surfaces. |

-continued

| Performance Indicator | Test item | Embodiment 1 | Embodiment 2 | Results and analysis |
|---|---|---|---|---|
| | Initial adhesion time (seconds) | 8 | 10 | The combination of the adhesion aid layer and the EVA hot melt adhesive enhances the quick bonding capability and enables firm adhesion in a short time. |
| Flexibility and durability | Thickness of the intermediate layer (mm) | 4.0 | 3.5 | In both embodiments, the compressive strength (26 kPa and 22 kPa) and flexible radius (4 cm and 4.5 cm) of XPE cotton meet the needs of different scenarios. |
| | Service life (simulated days) | 45 days | 60 days | No performance degradation or delamination occurred during the experimental period, and the composite structure presented notable durability under multi-layer bonding. |
| Comprehensive induction effect | Plant extract types and ratio | Geraniol + eucalyptus essential oil (2:1) | Geraniol + eucalyptus essential oil (1:1) | In both scenarios, pets were successfully induced to scratch mainly on the anti-scratch pad area, thus preventing damage to other parts of furniture surfaces. |
| | Coating thickness (μm) | 15 | 12 | The thickness is uniform and stable, and the spraying process guarantees uniform distribution of the induced effect. |
| Overall score (out of 10 points) | Anti-scratch performance | 9.8 | 9.5 | High-strength polyester fiber and 3D weaving process provide excellent anti-scratch ability. |

-continued

| Performance Indicator | Test item | Embodiment 1 | Embodiment 2 | Results and analysis |
|---|---|---|---|---|
| | Adhesion firmness | 9.7 | 9.6 | The dual protection of the back layer and the adhesion aid layer provides stable adhesion performance to meet the needs of multiple scenarios. |
| | Induction and coverage effect | 9.5 | 9.4 | The plant extract and the texture design act synergistically to induce pets to scratch and prevent behavioral diversion. |

As listed in Table 1, Embodiment 1 is more suitable for the protection of flat or large-area furniture surfaces, and exhibits superior anti-scratch performance and adhesive firmness. In contrast, Embodiment 2 is more applicable to curved surfaces (such as armrests, cylindrical furniture, etc.), and boasts better flexible adaptability and curved adhesive performance. The above results reveal that the anti-scratch pad demonstrates remarkable anti-scratch performance, adhesion stability, and induction effect in a variety of usage scenarios, and can effectively meet the actual needs of pet-owning families.

Although the embodiments of the present invention have been shown and described, it should be understood by those skilled in the art that, unless otherwise defined, the technical terms or scientific terms used in the present invention should have the meanings commonly understood by those with ordinary skills in the field to which the present invention belongs. Besides, the words "consist of" or "comprise" and the like used in the present invention mean that the elements or objects appearing before the word include the elements or objects listed after the word and their equivalents.

Although embodiments of the present invention have been shown and described, it should be understood by those skilled in the art that various changes, modifications, substitutions, and variations may be made to the embodiments without departing from the principles and spirit of the present invention, and that the scope of the present invention is defined by the appended claims and their equivalents.

The present invention provides an adhesive anti-scratch pad for pets, and the technical solutions thereof are introduced as follows: It includes a surface layer, at the bottom of which an intermediate layer is arranged. A reinforcement layer is arranged between the intermediate layer and the surface layer. A back layer is arranged at the bottom of the intermediate layer. An induction layer is arranged on the outer side of the surface layer, and an adhesion aid layer is arranged on the outer side of the back layer. For the anti-scratch pad of the present invention, the three-dimensional woven polyester fiber surface, the aramid fiber reinforcement layer, and the XPE cotton intermediate layer adopted jointly improve scratch resistance and flexibility and adapt to irregular surfaces. The EVA hot melt adhesive back layer and the nano silicon particle coating ensure an excellent adhesion effect on different surfaces and guarantee stability in high-temperature and humid environments. The induction layer releases the odor extracted from plants to attract pets to scratch, thereby reducing damage to furniture. All materials are environmentally friendly, safe, and harmless, and meet the environmental protection needs of families. The anti-scratch pad exhibits good anti-scratch performance and adhesion stability in a variety of scenarios, meeting the needs of pet-owning families.

What is claimed is:

1. An adhesive anti-scratch pad for pets, comprising:
a surface layer comprising three-dimensionally woven polyester fibers having a friction coefficient between 0.6 and 0.8;
an intermediate cushioning layer disposed beneath the surface layer, comprising chemically cross-linked expanded polyethylene (XPE) foam with a density between 30 kg/m$^3$ and 50 kg/m$^3$ and a thickness between 3 mm and 6 mm;
a reinforcement mesh layer positioned between the surface layer and the intermediate layer, comprising aramid fibers arranged in a grid structure with openings of 5 mm to 10 mm;
a back adhesive layer disposed beneath the intermediate layer, comprising ethylene-vinyl acetate (EVA) hot melt adhesive with a softening point between 60° C. and 80° C.;
an induction layer on the outer face of the surface layer, comprising microcapsules containing a plant extract coating with a diameter of 10 µm to 20 µm, wherein the plant extract comprises a mixture of geraniol and eucalyptus essential oils in a mixing ratio of 1:1 to 2:1; and
an adhesion enhancement layer on the external surface of the back adhesive layer, comprising a polyurethane coating with 5% to 10% silica nanoparticles.

2. The pad of claim 1, wherein the polyester fibers of the surface layer are treated with high-temperature sizing at a temperature between 160° C. and 180° C. and have a tensile strength of not less than 300 N.

3. The pad of claim 1, wherein the XPE foam is formed by dual-roller hot-pressing at a molding pressure between 200 kPa and 400 kPa.

4. The pad of claim 1, wherein the aramid fiber intersections are reinforced by an adhesive coating with a thickness of 0.01 mm to 0.03 mm.

\* \* \* \* \*